United States Patent [19]
Noe et al.

[11] 3,868,833
[45] Mar. 4, 1975

[54] SHAFT COUPLING APPARATUS PARTICULARLY FOR MARINE INBOARD-OUTBOARD PROPULSION SYSTEMS

[75] Inventors: Gerald H. Noe; William L. Woodfill, both of Oshkosh, Wis.

[73] Assignee: Brunswick Corporation, Skokie, Ill.

[22] Filed: Dec. 21, 1972

[21] Appl. No.: 317,198

[52] U.S. Cl. .................. 64/27 NM, 64/4, 115/114, 64/13, 74/574
[51] Int. Cl. ............................................. F16d 3/14
[58] Field of Search .......... 64/27 MN, 4, 27 R, 6, 3, 64/11 R, 10, 13; 115/11, 12, 14, 32 R, 32 F; 74/5.74

[56] References Cited
UNITED STATES PATENTS

| | | | |
|---|---|---|---|
| 1,949,520 | 3/1934 | Whisler | 64/11 R |
| 1,984,577 | 12/1934 | Griswold | 74/574 |
| 2,622,419 | 12/1952 | McIntyre | 64/27 NM |
| 2,679,735 | 6/1954 | Rowe | 64/32 F |
| 2,972,240 | 2/1961 | Wood | 64/27 NM |
| 3,007,305 | 11/1961 | Hamilton | 115/114 |
| 3,328,977 | 7/1967 | Wallis, Jr. | 64/4 |

FOREIGN PATENTS OR APPLICATIONS
| | | | |
|---|---|---|---|
| 941,443 | 11/1963 | Great Britain | 64/13 |

*Primary Examiner*—Samuel Scott
*Assistant Examiner*—Randall Heald
*Attorney, Agent, or Firm*—Andrus, Sceales, Starke & Sewall

[57] ABSTRACT

A pump impeller shaft of a marine inboard-outboard jet propulsion unit is connected directly to the engine shaft through a flexible coupling. A plurality of equi-circumferentially distributed resilient bushings are located within a mounting plate splined to the impeller shaft. The engine flywheel includes mounting studs passing through the bushings with an outer clamping plate abutting the bushings and compressing then against the flywheel. This provides a resilient coupling of the shafts. If a bushing should fail, the other bushings in combination with the bolted connection maintain an emergency drive system. The impeller shaft includes a housing having an axial flange telescoped with an axial flange of the engine housing. The overlapping flanges includes a mating frustoconical recess and triangular projection with resilient square O-rings located within the recess to opposite sides of the projection. The engine housing includes a bolted connection to axially compress the O-rings and provide a firm positive connection between the housings. The resilient bushings and the resilient housing member establish a positive axial alignment which can accommodate the vertical pitch, torsional roll, as well as the sideway yaw of the engine encountered in the operation of the boat. The housings are provided with vertical machined surfaces which are in a common plane when front engine mounts are located to create the proper angular alignment of the respective shafts.

11 Claims, 5 Drawing Figures

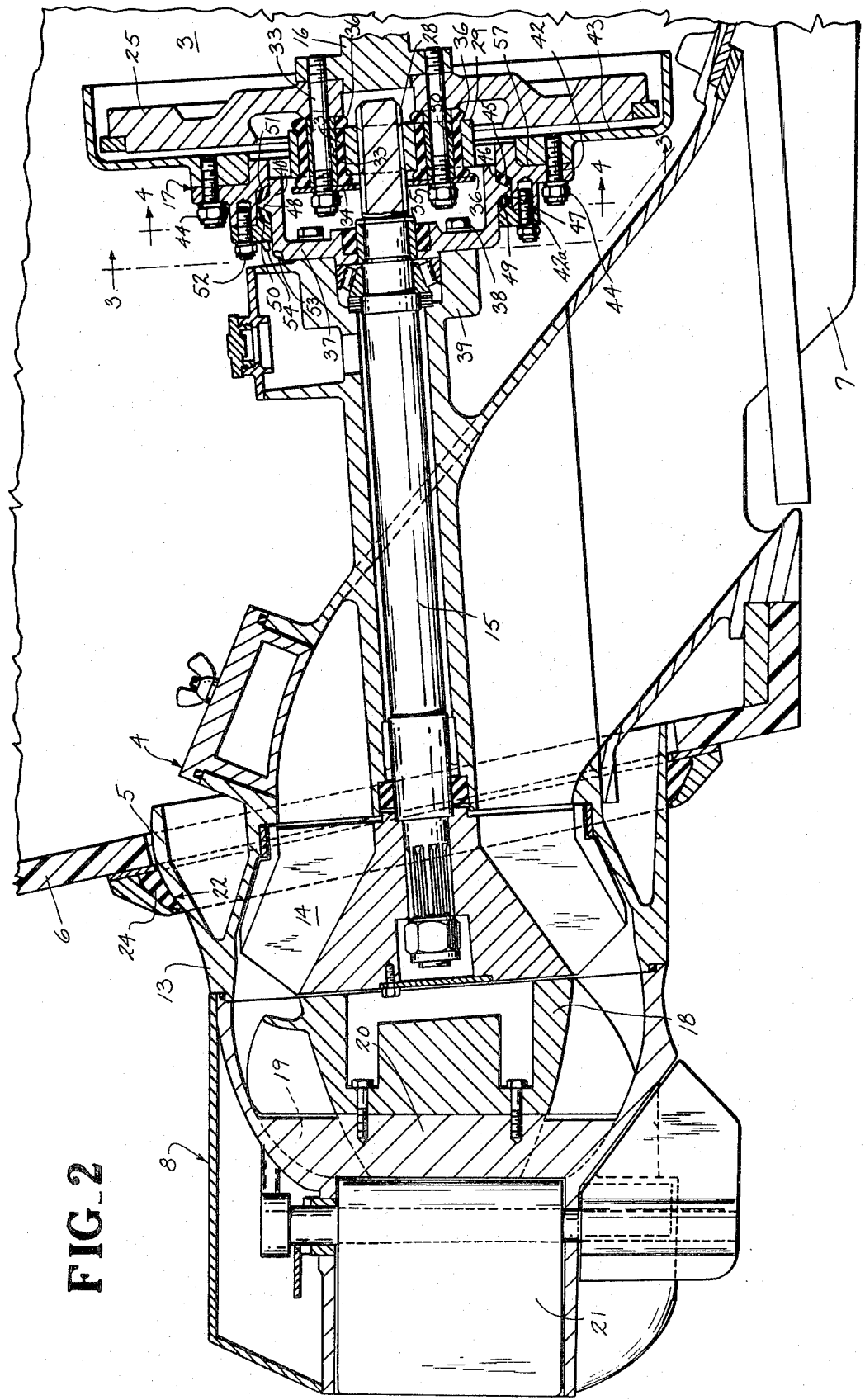

SHAFT COUPLING APPARATUS PARTICULARLY FOR MARINE INBOARD-OUTBOARD PROPULSION SYSTEMS

BACKGROUND OF THE INVENTION

The present invention relates to a couplng of a power source drive shaft means to a driven drive shaft means through a fail-safe flexible connection, and particularly to such a coupling for connecting of an engine shaft to a jet propulsion pump shaft.

Pleasure boats and the like may advantageously employ an inboard engine coupled to an outboard drive means. More recently jet drive propulsions have been employed wherein high velocity momentum jets are expelled through small nozzles in the rear or aft section of the boat for driving of the boat forwardly without the necessity of the conventional propeller drive. A highly satisfactory jet drive is shown in Applicant's copending application entitled "MARINE JET DRIVE PROPULSION APPARATUS" which was filed on the same day as this application and is assigned to a common assignee herewith. Generally, the internal combustion engine and the pump unit are separately constructed and mounted within the boat with the engine drive shaft coupled to the impeller drive shaft. The proper alignment and coupling of the engine shaft with the impeller shaft is very important to maintain efficient transfer of power and in particular to minimize bearing loads and thereby ensure a relatively long, reliable operating life. Further, the coupling means is preferably small and compact to permit mounting of the engine as far aft as possible and thereby increase the otherwise usable cockpit space and improve the weight distribution within the boat.

SUMMARY OF THE INVENTION

Generally, in accordance with the present invention, the driven shaft is connected directly to the drive shaft through a novel fail-safe flexible coupling which eliminates the conventional universal joint, while maintaining a positive interconnection and alignment between the shafts. Generally, the coupling includes a plurality of circumferentially distributed resilient bushings connected directly to a mounting memeber connected to the one shaft. An annular coupling ring-like member carried by the several bushings is suitably connected as by a splined type connection to a second shaft to provide a direct drive connection therebetween. As applied to a marine propulsion means, the bushings are suitably secured to an engine flywheel with a splined ring slidably coupled to the splined shaft of the pump impeller. If one or more of the bushings should fail, the other bushings in combination with the bolted connection will maintain the operation of the system for a limited period to ensure a proper drive coupling between the flywheel and engine to the impeller shaft.

The impeller shaft means provided with a suitable housing means having an axial flange telescoped with an axial frame flange of the engine housing. The overlapping flanges includes a mating recess and projection with mutually inclined and axially spaced side walls. A resilient means fills the space between the side walls of the overlapping flange members which are interconnected by a bolted connection to axially compress the resilient means and provide a firm positive connection between the impeller housing and the engine housing with the impeller shaft projecting into the splined coupling plate. The resilient bushings and the resilient housing member have been found to provide a particularly novel and improved direct mounting which produces positive axial alignment.

Further, the dual reslient coupling of the shafts and housings readily accommodates the vertical pitch, torsional roll, as well as the sideway yaw encountered in the operation of the boat.

In accordance with a further aspect of the present invention, the rear engine mount is provided with vertical machined surfaces on the impeller housing and the engine housing to provide for direct indication to the installer of the necessary front mount adjustments to ensure proper angular alignment of the respective shafts.

The present invention provides a relatively simple and readily produced engine-impeller coupling for jet drives and the like which provide a long and reliable life as well as ready maintenance and servicing.

BRIEF DESCRIPTION OF DRAWINGS

The drawings furnished herewith illustrate the best mode presently contemplated for carrying out the invention and clearly disclose the above advantages and features as well as others which will be readily understood from the description of such illustrated embodiment.

In the drawings:

FIG. 2 is an enlarged vertical longitudinal section through the boat and clearly illustrating the coupling and interconnection of a splined impeller shaft to a flywheel of the engine;

DESCRIPTION OF ILLUSTRATED EMBODIMENT

Figure 1:
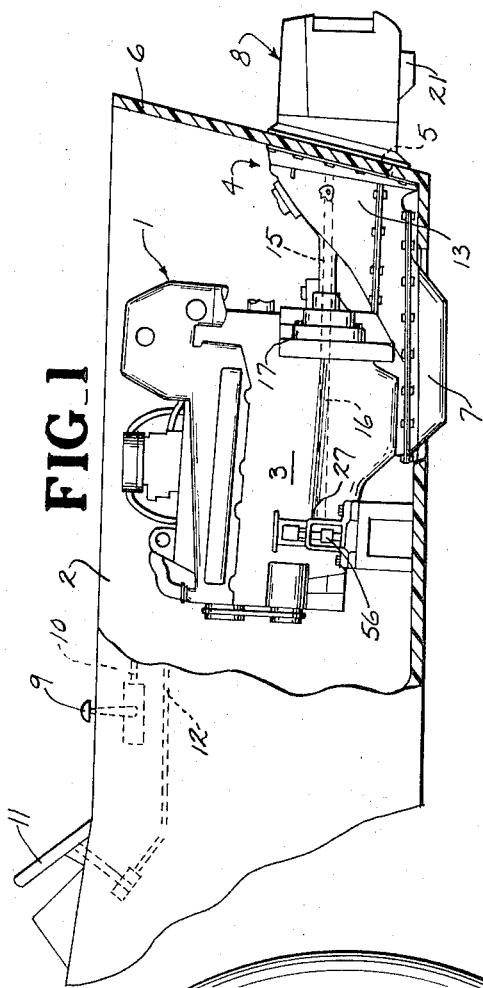
FIG. 1 is a side elevational view of a boat with parts broken away and sectioned to show the coupling of an inboard engine to a boat jet drive construction in accordance with the present invention.
Figure 3:
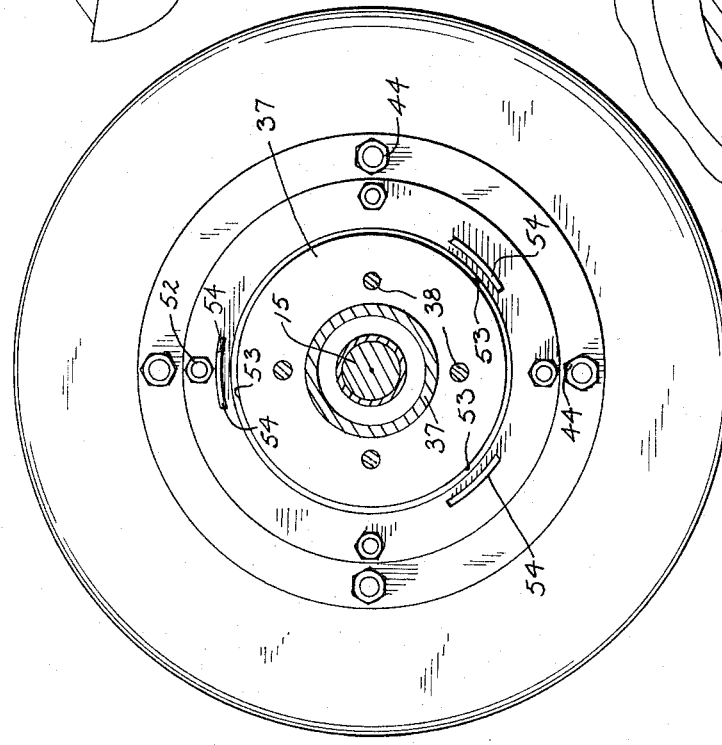
FIG. 3 is a vertical section taken on line 3—3 of FIG. 2.

Referring to the drawings and particularly to FIG. 1, a marine jet propulsion unit 1 is mounted within a boat 2, of which only a fragmentary portion is shown. The propulsion unit 1 includes a suitable power source such as an internal combustion engine 3 connected to a drive pump unit 4 which extends through an opening 5 in the boat transom 6. The pump unit 4 has an inlet opening 7 in the lower wall portion of the boat 2 and is adapted to draw water upwardly through the boat, pressurizes the water and delivers the pressurized water through a discharge of jet control unit 8 mounted aft of the transom and interconnected to and forming a part of the pump unit 4. A remote steering control includes a shift lever 9 connected by a shifting cable 10 to unit 8 for selecting forward and reverse movement and a steering wheel 11 connected by a steering cable 12 for turning laterally to the right or left side. The precise construction of the pump unit 4 may be of any suitable design which will transfer the necessary large volume of water, greatly increase its momentum and discharge such water through the rear control unit 8 which extends from the aft end of the boat 2, generally on the longitudinal center line of the boat.

Referring particularly to FIG. 2, the illustrated pump unit 4 is of a generally mixed flow centrifugal construction having an inner or forward housing 13 mounted forwardly of the transom 6 and projecting rearwardly through the transom opening 5. The pump impeller 14, rotatably mounted within the forward housing section 13, is secured to a driven shaft 15 which projects forwardly and is coupled to the crank shaft 16 of the engine 3 in accordance with a special coupling assembly means 17 in accordance with the teaching of the present invention.

A rearward impeller housing 18 is integrally formed with the control unilt 8 and includes a rear impeller bowl with stator vanes for directing of the increased momentum water rearwardly through a pair of jet passageways or channels 19 to the opposite sides of deflection control wall 20 terminating in exit nozzles in the outermost end of the control unit 8. The control unit 8 includes a rear rudder 21 for steering and a reverse means 22 for controlling the boat movement, as more fully shown and described in Applicant's previously referred to co-pending application.

The transom opening 5 is sealed by a suitable sealing means 23 between the transom 6 and the housing 13. The illustrated seal is especially constructed in accordance with the teaching of the co-pending application of William L. Woodfill entitled "MARINE JET PROPULSION SEAL UNIT APPARATUS" which was filed on the same day as this applicaton and is assigned to a common assignee herewith. Generally the seal means 23 includes a relatively large resilient member 24 clamped between the transom and the pump housing.

As the particular construction of the seal means and control unit do not form a part of the subject matter of the present invention claimed herein, no further description thereof is given.

The present invention is particularly directed to the engine coupling assembly 17 which provides the interconnection between the impeller and engine drive shafts 15 and 16, through the engine flywheel 25 in the illustrated embodiment. The impeller drive shaft 15 is coupled to drive the pump unit 4 and is located in a predetermined horizontal alignment within the boat 2. The flywheel 25 is connected to the engine crank shaft 16. The engine 3 is provided with adjustable front mounts 27 to allow accurate alignment of the engine shaft 16 with the preset impeller shaft 15, as shown in FIG. 1.

More particularly, in the illustrated embodiment of assembly 17, the rearmost end of the impeller driven shaft 15 is splined as at 28 and mates with a correspondingly splined annular coupling member in the form of an annular plate 29 resiliently interconnnected to the face of the flywheel 25 to provide a direct coupling therebetween.

Figure 4:
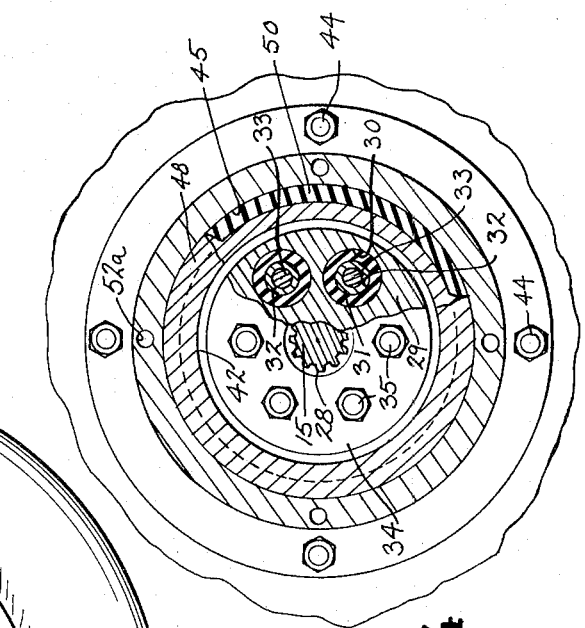
FIG. 4 is a vertical section taken generally on line 4—4 of FIG. 2 and further illustrating the construction of the coupling unit shown in FIGS. 1 and 2.

The annular plate 29 is provided with a plurality of apertures 30, shown as six which are equicircumferentially located coaxially of the common shaft axis, as most clearly shown in FIGS. 2 and 4. A tubular bushing 31 of a suitable resilient rubber-like material is located within each of the openings 30 and includes an inner spacer sleeve 32. Studs 33 are attached to the face of the flywheel 25 and project through the sleeve 32. An outer annular clamping plate 34 is mounted over the studs 33 in abutting relation to the bushings 31 and extends radially outwardly beyond the surfaces of the bushings. In a free state, the bushings 31 extend axially beyond the ends of the inner sleeves 32. When nuts 35 on the outer end of the studs 33 are drawn up, the plate 34 and bushings 31 move into engagement with a flat surface 36 of the flywheel 25. Further tightening of nuts 35 force the plate 34 and bushings 31 inwardly to compress the bushings 31 as at 36 in FIG. 2, until each sleeve 32 is clamplted between the flywheel face 36 and the compressing plate 34 to provide a firm and rigid interconnection therebetween. The resilient bushings 31 provide a resilient interconnection of the annular drive plate 29 to the flywheel 25. The rotation of engine 16 and the attached flywheel 25 is transmitted through the bushings 31 to the splined plate and thereby directly to the impeller drive shaft 15.

This construction provides for a very reliable and stable mounting of the pump unit 4 and the engine 3 while permitting relatively close spacements therebetween to minimize the cockpit area required between the pump means and the engine.

The adjacent driven end of the impeller shaft 15 is supported in a radial bearing housing 37, which is generally a cup-shaped member. Housing 37 is bolted as at 38, or otherwise secured to the outer end of the impeller drive shaft bearing housing 39. The cup-shaped housing 37 opens toward the drive shaft coupling assembly 17 and is telescoped over the clamping plate 34 in the illustrated embodiment of the invention. The outer flange 40 of the cup-shaped housing 37 is telescoped into a two-piece clamping and sealing flange 42 having an outer cover 42a which is bolted or otherwise rigidly affixed to flange 42. The flange 42, upon installation in a boat, is bolted to the flywheel housing 43 as at 44 to form a part of the total engine unit 3.

Figure 5:
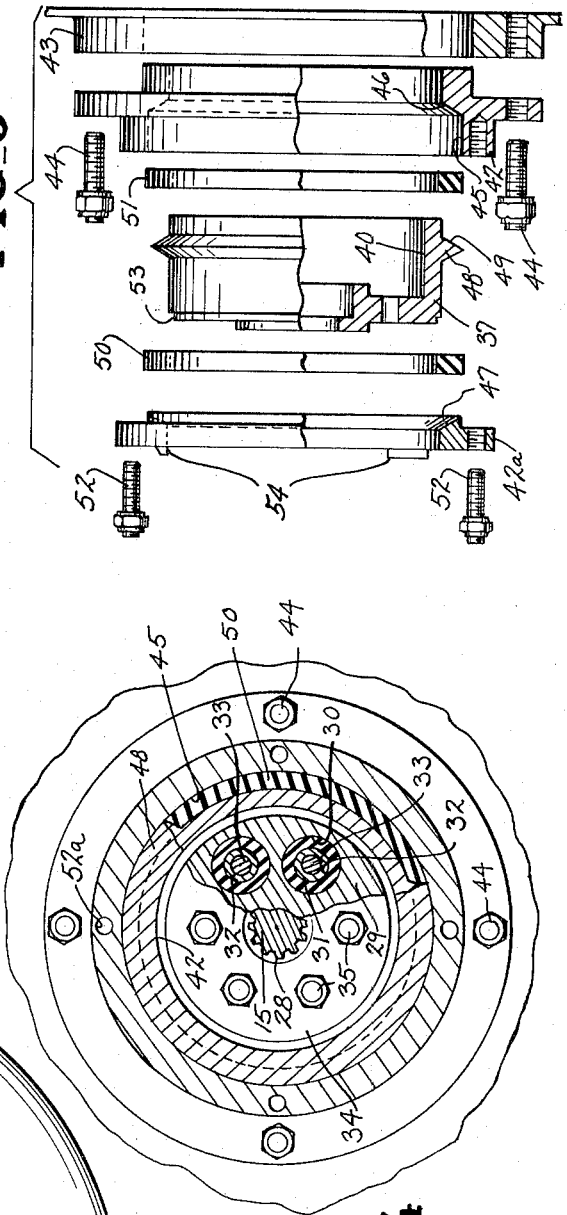
FIG. 5 is an exploded view of a portion of the coupling.

The sealing flange 42 and cover 42a are shaped to form an annular recess opening toward the flange 40 and having a flat peripheral base 45 and outwardly flared side walls 46 and 47 defining a generally frustoconical cross section, as most clearly shown in FIGS. 2 and 5. The inwardly projecting flange 40 on the cup-shaped housing 37 in turn includes an annular projection 48 located generally centrally of the recess 44. The projection 48 is generally triangular in cross section, with tapered walls 49 essentially corresponding to the taper of the frustoconical side walls 46 and 47. A pair of rubber ring member 50 and 51 are located within the recess, one each to the opposite sides of the projection 48 and are clamped in place between the respective sidewalls upon drawilng up of the clamping bolts 52 to draw the flange 40 into the flange 42.

The outer corner of the cup-shaped housing 37 if machined to define at least three equicircumferentially spaced and precisely located surfaces 53 lying in a common plane normal to the common shaft axis. The clamping ring 42a, in turn, is provided with an outer machined ring surface 54 lying in a common plane normal to the engine shaft axis and which defines a very precisely located surface with respect to the engine. At least three equicircumferentially spaced surface portions are provided on the respective members in order to properly define a plane. The front rubber engine mounts are generally any suitable and well-known type of a rubber mount which are normally shimmed or made adjustable as at 56 (FIG. 1) to pivot the engine about the fixed rear mounts and produce angular orientation of the engine to align the engine shaft 16 with the impeller shaft 15.

In the final assembly, the front engine mounts 27 are adjusted until the locating surfaces are in precise coplanar alignment, thereby providing a direct built-in visual adjustment indicator which will assure proper angular alignment of the drive shafts 15 and 16. This is particularly desirable in permitting a very convenient and rapid single man installation of the assembly.

In the mounting within the boat, the pump unit 4 and the pump connected portion of the coupling means 17 to and including the element 42 are mounted in the boat 2. The engine with the associated coupling portions are then slid into place with plate 29 sliding onto the shaft 15 until the abutting surfaces 57 of members 42 and 43 meet. Bolt and nut units 44 are then drawn up to firmly connect pump-engine assembly. Thus, the flat abutting surfaces of the members 42 and 43 provide a convenient split point or tine for use in the installation procedure.

The present invention has thus been found to provide a very simple, reliable and efficient coupling particularly adapted for marine propulsion drive jet systems.

Various modes of carrying out the invention are contemplated as being within the scope of the following claims, particularly pointing out and distinctly claiming the subject matter which is regarded as the invention.

I claim:

1. A coupling for connecting the engine shaft of an engine carried by a boat hull to the drive shaft of an aft mounted drive means; said coupling comprising a circular coupling plate having an inner shaft opening means for receiving and connection to one of said shafts with a plurality of equicircumferentially spaced interconnecting projections, said plate having a plurality of coupling openings, a flywheel secured to the second of said shafts and extending outwardly of said circular plate, a plurality of circumferentially distributed resilient mounts secured one each within each opening in said coupling plate, each of said resilient mounts having a resilient tubular bushing extending axially of the coupling plate with an outer diameter essentially corresponding to the opening and having an inner sleeve having end faces inwardly of the ends of the bushing, an annular clamping plate abutting the outer face of said bushings, clamping bolt means extending through said clamping plate and said sleeves and into said flywheel and forcing said clamping plate against said bushings and said bushings against said flywheel to compress said bushings and to deform said bushing outwardly of the annular plate and thereby provide a firm resilient interconnection of the first shaft to said mounting member.

2. A coupling for connecting the shaft of an engine carried by a boat hull to the shaft of an aft mounted drive means; said coupling comprising an annular coupling member having an inner shaft opening means for receiving and connection to one of said drive shafts, a mounting member secured to the second of said shafts, a plurality of circumferentially distributed resilient mounts secured within said annular coupling member, each of said resilient mounts having a resilient tubular bushing extending axially of the coupling member and having an inner sleeve having end faces inwardly of the ends of the bushing, a clamping plate abutting the outer face of said bushings, clamping bolt means extending through said clamping plate and said sleeves and provides a clamping interconnection to the mounting member, whereby said clamping plate compresses said bushings to provide a firm resilient interconnection of the first shaft to said mounting member, a pair of telescoped housing members secured one each to the drive means and to the engine, a projection and recess coupling between said telescoped housing members, said projection and recess having corresponding inclined side walls, and resilient members clamped between the side walls of the projection and the side walls of the recess to interconnect said housings.

3. A coupling for connecting the engine shaft of an engine carried by a boat hull to the drive shaft of an aft mounted drive means; said coupling comprising an annular coupling plate having an inner shaft opening means for receiving and connection to one of said drive shaft, a flywheel secured to the engine shafts, a plurality of circumferentially distributed resilient mounts secured within said annular coupling plate, each of said resilient mounts having a resilient tubular bushing extending axially of the coupling member and having an inner sleeve having end faces inwardly of the ends of the bushing, a clamping plate abutting the outer face of said bushings, clamping bolt means extending through said clamping plate and said sleeves and provides a clamping interconnection to the mounting member, whereby said clamping plate compresses said bushings to provide a firm resilient interconnection of the first shaft to said mounting member, a flywheel cover mounted in relatively fixed relationship to said flywheel and including an outwardly projecting tubular flange extending coaxially of the coupling toward said drive means, a bearing cap secured to the drive means and including a tubular flange projecting coaxially into the fly flange and in close spaced relation to said flywheel flange, the flange of said flywheel housing including an annular recess with an inner peripheral opening extending axially of the flange and having an outer removable wall including the one side wall of said recess, said bearing cap tubular flange having an annular projection centrally located in said recess, a pair of resilient ring members disposed within said recess one each to the opposite side of said projection whereby a resilient firm interconnection is established upon tightening of the bolt means.

4. The coupling of claim 3 wherein said recess and projection having essentially similar depths and similar inclined side walls.

5. A coupling for connectiing the shaft of an engine carried by a boat hull to the shaft of an aft mounted drive means; said coupling comprising an annular coupling circular plate having an inner shaft opening means for receiving and connection to one of said drive shafts, a plurality of circumferentially distributed resilient mounts secured within said annular coupling plate, a flywheel secured to the second of said shafts, connecting means interconnecting said resilient mounts to said flywheel, said flywheel extending radially outwardly of said coupling plate, a fly-wheel cover including an outwardly projecting tubular flange extending toward said drive means, a bearing cap secured to the drive means and including a tubular flange projecting in close spaced relation into said flywheel flange, the flange of said flywheel housing including an annular recess with an inner peripheral opening extending axially of the flange and having an outer removable wall including the one side wall of said recess, said bearing cap flange having an annular projection centrally located in said recess, a pair of resilient ring members disposed within said recess one each to the opposite side of said projection whereby a resilient firm interconnection is established upon tightening of the bolt means, said cap including at least three radial machined surfaces lying in a common plane normal to the axis of the drive means shaft, said removable outer wall having corresponding coplanar machined surfaces circumferentially located in alignment with said machined surfaces on said cap, said housings being in precise proper alignment with all of said machined surfaces on the cap and the flywheel flange being in a common plane for establishing precise alignment of the engine shaft and the drive means shaft.

6. A coupling for connecting the crankshaft of an engine carried by a boat hull to the drive shaft of an aft mounted drive means; said coupling comprising an annular coupling member having an inner shaft opening means for receiving said drive shaft with circumferentially spaced interconnecting projections establishing a direct drive therebetween, a flywheel secured to the shafts, a plurality of equicircumferentially distributed resilient mounts secured within said annular couplilng member, each of said resilient mounts having a resilient tubular bushing extending axially of the couplng member and having an inner sleeve having end faces inwardly of the ends of the bushing, a clamping plate abutting the outer face of said bushings, clamping bolt means extending through said clamping plate and said sleeves and provides a clamping interconnection to the mounting member, whereby said clamping plate compresses said bushings to provide a firm resilient interconnection of the first shaft to said mounting member, said flywheel extends radially outwardly of said coupling member, a flywheel cover including an outwardly projecting tubular flange extending toward said drive means and having an outer removable end wall, axially extended bolt means interconnecting said end wall to said flywheel cover, a bearing cap secured to the drive means and including a tubular flange projecting into said flywheel flange in close spaced relation thereto, the flange of said flywheel cover including an annular recess on the surface with a frustoconical cross section having a small inner base and a large peripheral opening extending axially of the flange, said removable wall including one side wall of said recess, said bearing cap flange having an annular projecting wall centrally located in said recess, said projecting wall being essentially an equilateral triangular of a depth closely approximating the depth of said frustoconical recess and of a substantially smaller width, and resilient mount and seal members disposed within said recess one each to the opposite side of said projecting wall whereby a resilient firm interconnection is established upon attachment of said removable wall.

7. The coupling apparatus of claim 6 wherein said cap includes three radial machined surfaces lying in a common plane normal to the axis of the drive means shaft, said flywheel cover having corresponding coplanar machined surfaces circumferentially located in alilgnment with said machined surfaces on said cap, and adjustable mount means for selectively raising and lowering of the engine to permit precise alignment of the several corresponding machined surfaces on the cap and the flywheel flange and establishing precise alignment of the engine shaft and the drive means shaft with all of said machined surfaces in a common plane.

8. In a marine propulsion system including a boat hull having a transom, an internal-combustion engine carried by said boat hull and mounted forward of the transom, a jet housing unit mounted on said boat hull adjacent said transom and having a pump means extending rearwardly through a transom opening, said internal-combustion engine and said pump means having respective drive shafts, said engine drive shaft being connected to a flywheel means, the improvement in a coupling assembly for interconnecting said drive shafts, said coupling assembly comprising a plurality of circumferentially distributed resilient bushings secured to the face of the flywheel, a coupling plate carried by said bushings and having an inner shaft opening accommodating and receiving the pump drive shaft, means circumferentially interconnecting said pump drive shaft and said coupling plate, a pump housing member for said pump drive shaft opening toward the engine, an engine housing member telescoped over the pump housing member, a projecting wall and recess coupling between said housing members, said projecting wall and recess having corresponding inclined side walls to define a pair of similar oppositely inclined clamping chambers with means to axially move at least one of said side walls, and annular resilient means encircling said housing members within said clamping chambers and clamped between the inclined side walls of the projection and the corresponding inclined side walls of the recess.

9. The marine propulsion apparatus of claim 8 wherein each of said bushings is a tubular member extending axially of the coupling plate and having an inner sleeve having ends located inwardly of the ends of the bushing, a clamping plate abutting the outer face of said bushings, clamping bolt means extending through said clamping plate and said bushings and tightened to clamp the bushings and plate to the flywheel, whereby said clamping plate compresses said bushings to provide a firm resilient interconnection of the pump shaft to the flywheel.

10. The marine propulsion apparatus of claim 9 wherein said flywheel extends radially outwardly of said coupling, said engine housing member being a flywheel cover including an outwadly projecting tubular flange extending toward said pump housing member and terminating in an outer cap, said pump housing member including a tubular flange projecting into said flywheel flange in close spaced relation thereto, axially extended bolt means interconnecting said end cap to said flywheel housing flange to draw the cap over the pump tubular flange, the flange of said flywheel housing including an annular recess having a frustoconical cross section with a small base and a large peripheral opening extending axially of the flange, said tubular flange of the pump housing member having an annular projection defining said projecting wall centrally located in said recess, said projecting wall being essentially an equilateral triangular of a depth closely approximating the depth of said frustoconical recess and of a substantially smaller width, said resilient means including a pair of square ring seal members disposed within said recess one each to the opposite side of said projecting wall whereby a resilient firm interconnection is established upon tightening of the bolt means.

11. The marine propulsion apparatus of claim 10 wherein said pump means tubular flange is a cap-shaped member having a lateral wall normal to the shaft, said lateral wall including at least three radial machined surfaces lying in a common plane normal to the axis of the pump drive shaft, said flywheel flange cap having corresponding coplanar machined surfaces circumferentially located in alignment with said machined surfaces on said lateral wall, said engine having adjustable front mount means for selectively raising and lowering of the engine to permit precise alignment of the several corresponding machined surfaces on the lateral wall and the flywheel flange cap and establishing precise alignment of the engine drive shaft and the pump drive shaft with all of said machined surfaces in a common plane.

* * * * *

UNITED STATES PATENT OFFICE
CERTIFICATE OF CORRECTION

PATENT NO. : 3,868,833
DATED : March 4, 1975
INVENTOR(S) : GERALD H. NOE & WILLIAM L. WOODFILL It is certified that error appears in the above-identified patent and that said Letters Patent are hereby corrected as shown below:

Column 1, line 46, After "mounting" delete "memeber" and substitute therefor ---member---;

Column 3, line 15, After "control" delete "unilt" and substitute therefor ---unit---;

Column 4, line 10, After "is" delete "clampled" and substitute therefor ---clamped---;

Column 7, line 24, After "annular" delete "couplilng" and substitute therefor ---coupling---;

Column 8, line 46, After "an" delete "outwadly" and substitute therefor ---outwardly---;

Column 8, line 68, After "a" delete "cap-" and substitute therefor ---cup- ---.

Signed and sealed this 20th day of May 1975.

(SEAL)
Attest:

RUTH C. MASON
Attesting Officer

C. MARSHALL DANN
Commissioner of Patents
and Trademarks